Figure 1:
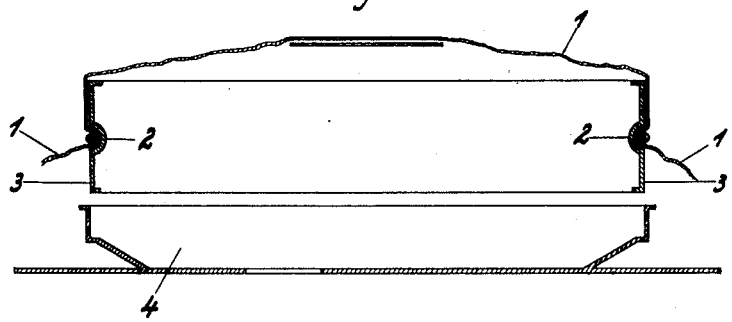

June 30, 1931.  H. GERDES  1,812,333
GAS METER
Filed May 22, 1926

Inventor:
Heinrich Gerdes.
per
Attorney.

Patented June 30, 1931

1,812,333

UNITED STATES PATENT OFFICE

HEINRICH GERDES, OF BERLIN-SCHONEBERG, GERMANY, ASSIGNOR TO JULIUS PINTSCH AKTIENGESELLSCHAFT, OF BERLIN, GERMANY

GAS METER

Application filed May 22, 1926, Serial No. 110,981, and in Germany May 29, 1925.

This invention relates to gas meters, and more particularly to the dry form of meter.

In the case of dry gas meters it is usual to employ one or more membranes composed of fabric or leather, which divide the casing of the meter into two or more measuring chambers. The movement of the membrane occasioned by the alternate filling of the measuring chambers with gas is employed for opening and closing the inlet and outlet valves, and for actuating the counting mechanism. It has hitherto been usual to secure the membrane either to the wall of the casing, or to interior parts of the meter. Damage to the membrane accordingly necessitates the meter being taken entirely apart whereby the operation of interchanging the membrane is a lengthy and costly matter, quite apart from the fact that only skilled workers can be employed for this job, and a fresh graduation is also required.

It is therefore desirable to arrange the membrane in such manner that the same, after the casing has been opened, may be readily interchanged by unskilled workers, without necessity for removal of the interior parts of the meter, whereby the size of the measuring chamber remains the same.

This is accomplished according to the invention by securing the membrane to an annular or other shaped metal portion, for example by firmly binding or in other suitable manner, and fitting the two parts (ring and membrane) together into the measuring chamber.

The invention will now be described more fully with reference to the accompanying drawings, in the various figures of which similar reference characters are employed to denote like parts.

Fig. 1, being a cross-section, shows one form of embodiment for carrying the invention into effect.

Figure 2:
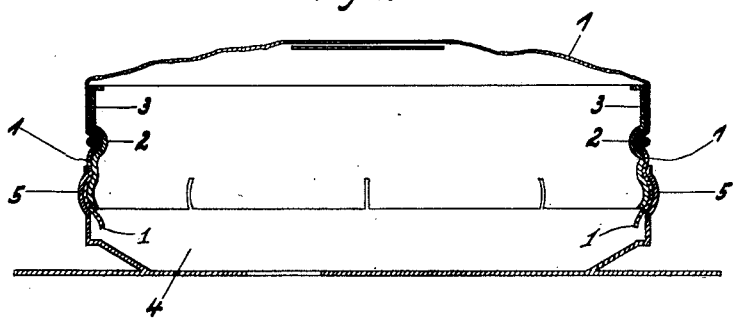
Figure 3:
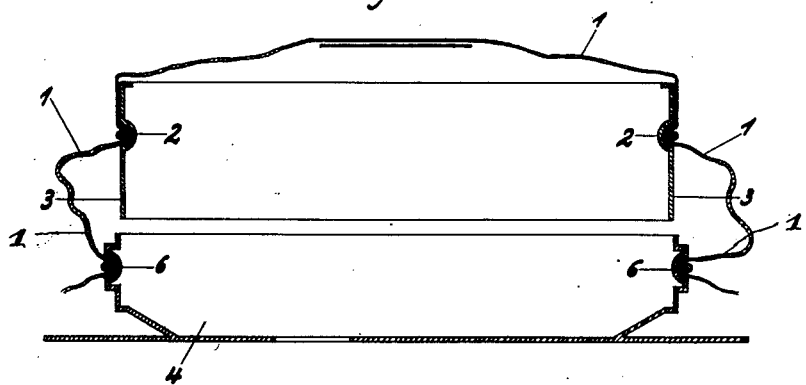

Figs. 2 and 3, also cross-sections, show two further forms of embodiment.

With reference to Fig. 1, the membrane 1 is held in an annular groove 2 in the ring 3 by binding or a resilient ring, the ring 3 being simply fitted into the measuring chamber 4.

In the case of the embodiment according to Fig. 2, the method of securing the membrane 1 to the ring 3 is the same as in the previous example, in this instance, however, the lower edge of the ring 3 being furnished with slots, so that the ring, which is held in the rounding 5 of the part 4, acts in the manner of a spring ring, thus providing a better connection between the two parts. The connection may be made more gastight by passing the loose edge of the membrane 1 about the lower edge of the ring, and using the same as a packing.

A still more gastight connection between the ring 3 and the chamber 4 is shown in Fig. 3. After insertion of the ring 3 into the chamber 4, the edge of the membrane 1 is secured by binding in an annular groove 6 in the chamber 4. This embodiment provides a clean and tight connection between the membrane 1, the ring 3 and the measuring chamber 4.

The method of mounting the membrane described in the above allows, after the casing of the meter has been opened, the membrane to be readily interchanged, without necessity for removing from the casing the interior parts of the meter.

What I claim as new and desire to secure by Letters Patent is:

1. A dry gas meter comprising a meter casing having a cylindrical portion provided with an annular groove, a ring having a resilient annular ridge coacting with said annular groove, said ring being provided with an annular groove, a diaphragm positioned across said ring and means maintaining said diaphragm positioned, comprising a resilient ring frictionally holding said diaphragm in said annular groove of said ring.

2. In a dry gas meter, in combination, a meter casing having a cylindrical portion provided with an annular groove, a ring having a resilient annular ridge coacting with said annular groove, said ring being provided with an annular groove, a diaphragm positioned across said ring and means maintaining said diaphragm positioned, comprising a resilient ring frictionally holding said diaphragm in said annular groove of said ring, said diaphragm being frictionally held between said resilient annular ridge and said annular groove of said meter casing.

In testimony whereof I have affixed my signature.

HEINRICH GERDES.